United States Patent [19]

Pavlik et al.

[11] Patent Number: 4,508,985
[45] Date of Patent: Apr. 2, 1985

[54] DYNAMOELECTRIC MACHINE WITH ROTOR VENTILATION SYSTEM INCLUDING AXIAL DUCT INLET FAIRING

[75] Inventors: Dennis Pavlik, Murrysville; Richard A. Gronholm, Monroeville, both of Pa.

[73] Assignee: Westinghouse Electric Corp., Pittsburgh, Pa.

[21] Appl. No.: 552,592

[22] Filed: Nov. 16, 1983

[51] Int. Cl.³ .............................................. H02K 9/00
[52] U.S. Cl. ...................................... 310/55; 310/51; 310/64; 310/270
[58] Field of Search .................. 310/261, 270, 52, 53, 310/64, 65, 61, 55, 57, 58, 59, 60 R, 60 A, 61, 62, 63, 214

[56] References Cited

U.S. PATENT DOCUMENTS

| | | | |
|---|---|---|---|
| 1,784,102 | 12/1930 | Lincoln | 310/62 |
| 2,920,218 | 1/1960 | Beckwith | 310/55 |
| 2,920,219 | 1/1960 | Beckwith | 310/55 |
| 3,110,827 | 11/1965 | Baudry | 310/55 |
| 3,502,916 | 3/1970 | Stavrache | 310/62 |
| 3,739,208 | 6/1973 | Shartrand | 310/52 |
| 4,446,391 | 5/1984 | Sekine | 310/63 |

FOREIGN PATENT DOCUMENTS

| | | | |
|---|---|---|---|
| 0153586 | 11/1930 | Switzerland | 310/64 |
| 0908718 | 10/1962 | United Kingdom | 310/64 |

Primary Examiner—R. Skudy
Attorney, Agent, or Firm—G. H. Telfer

[57] ABSTRACT

An electrical machine with a radial path air-cooled rotor is provided with an axial duct inlet fairing. The inlet fairing, in conjunction with the other elements of the structure, reduces the inlet pressure drop by a substantial factor and provides more effective cooling. In addition, the fairing provides a simple means of orificing the rotor axial ducts for thermally balancing the rotor slot conductors.

4 Claims, 8 Drawing Figures

DYNAMOELECTRIC MACHINE WITH ROTOR VENTILATION SYSTEM INCLUDING AXIAL DUCT INLET FAIRING

The Government has rights in this invention pursuant to Contract No. N00024-79-C-4175 awarded by the Department of the Navy.

BACKGROUND AND SUMMARY OF THE INVENTION

This invention relates to dynamoelectric machines with a radial path, air-cooled rotor in which the rotor is cooled by a gas such as air that flows axially into the rotor and radially out through passages in the slot conductors.

In former machines of a known type, the rotor cooling gas enters an axial duct at the bottom of each coil slot. The axial duct serves as a manifold from which the gas is vented through a plurality of radially extending vents that go through the slot conductors. Practical machine construction has required having an insulative cell lining each coil slot and extending somewhat, such as one inch, from the ends of the rotor to ensure integrity of the insulation. A channel member is disposed at the bottom of the slots adjacent the cell and also extends somewhat from the ends of the rotor. The edges of the protruding portions of the ventilating channel and cell have an adverse effect on the flow through the channel because they represent a relatively sharp edged protruding entrance which produces a high inlet pressure drop that results in less than desirable flow rates and hence higher temperatures of the rotor and the conductors therein. Air flow can be improved by external blowers mounted on the shaft that act as fans producing greater flow into the ventilating channels. The external blowers contribute to an increase in machine size, weight and airborne noise levels which is undesirable.

In accordance with the present invention, the basic described structure including a slot cell and channel that extend from the face of the rotor is modified by the provision of a fairing that is disposed against the rotor end face adjacent the protruding cell and channel and shaped to fit closely around the extended portions of the cell and channel and to have a smooth flow transition region that introduces coolant gas into the channel during rotation of the rotor with a low inlet pressure drop, found to be reduced by a factor of about 20 as compared to that of the former structure. A consequent increase in the flow rate of air through the rotor and better cooling results so a higher machine rating can be achieved. The use of the fairing to modify the pressure drop at the channel inlet can improve the machine rating and eliminate or reduce the need for external blowers. Machine rating per unit weight (KW/lb.) can therefore be improved by up to about three or four percent which is particularly significant in certain applications such as for shipboard use.

The channel inlet fairing also improves the facility with which the respective channels can be individually orificed for thermal balancing of the rotor slot conductors. By "orificing" is meant the practice of partially blocking certain channels found by tests to have greater cooling than others. The balancing permits all channels, and hence all parts of the rotor, to be equally cooled and lessens the structure-borne noise produced by the machine. By this invention, the fairing provides a surface on which a blocking element can be readily fastened, partially covering the channel opening to the extent necessary to achieve the desired balance. In the past, it has been less convenient to mount a blocking element at the channel opening.

DESCRIPTION OF THE PREFERRED EMBODIMENTS

Figure 1:
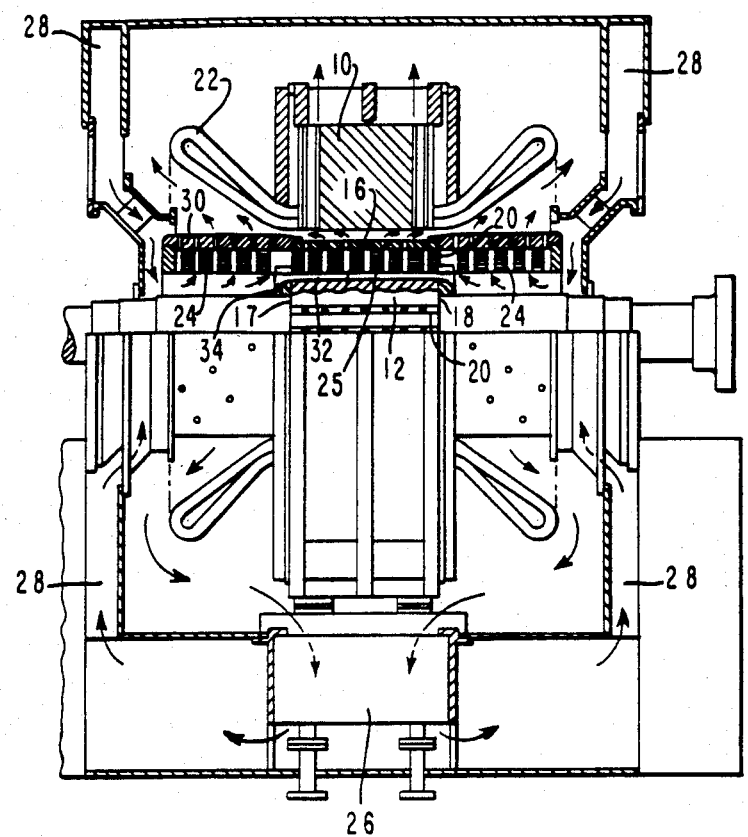
FIG. 1 is a general view partly in cross section of a dynamoelectric machine with the present invention.

In the machine of the type shown in FIG. 1, which may be, for example, a medium size turbine generator, there is a stator 10 with a rotor 12 centrally disposed on a shaft 14 for rotation within the stator. The rotor 12 and shaft 14 can be forged together. The rotor 12 has an outer body portion 16 with axially opposing end faces 17 and 18 and a plurality of axially extending coil slots 20.

The stator 10 and its windings 22 may be water cooled or otherwise suitably cooled. The cooling of the rotor 12 and its windings which have end turns 24 and slot portions 25 is of principal interest in regards to the present invention. As shown by the arrows in FIG. 1, a gas (e.g., air) circulates from a cooler 26 (e.g., a heat exchanger with water cooling) through an inlet duct 28 at each end of the machine, and axially under the end turn portion of the rotor winding 24. Part of the air passes radially through radial passages in the end turns 24 and retaining ring 30. Remaining air enters a channel 32 at the bottom of each slot 20 and out through radial passages in the slot portion of the rotor winding 25, then axially out through the air gap and back to the cooler 26.

FIG. 1 shows a fairing 34 attached to each rotor body 16 end face 17 and 18 adjacent the openings to the channel 32. The fairing 34 smooths the air flow into the channel 32 so that there is less pressure drop and hence greater air flow.

Figure 2:
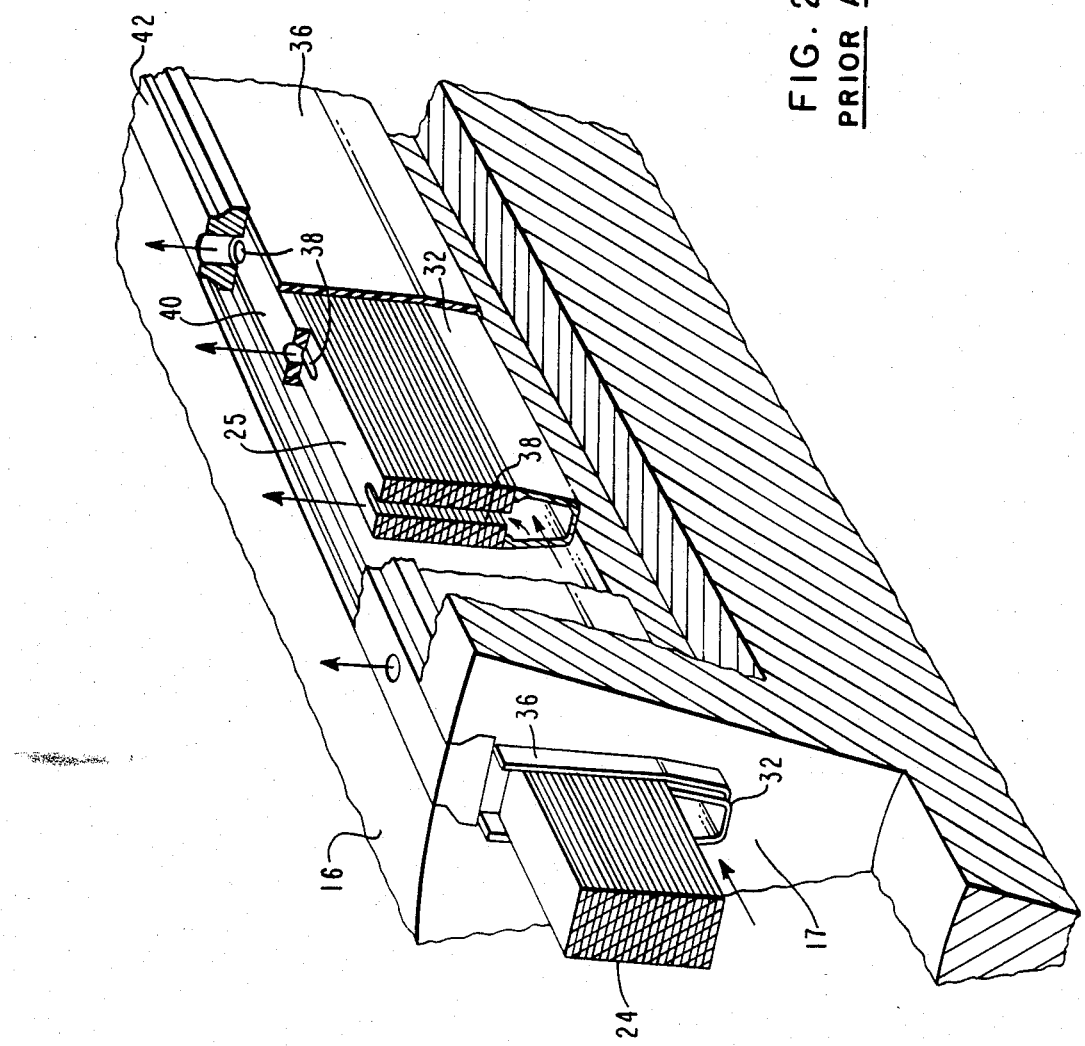
FIG. 2 is a perspective view with broken away elements of a ventilation arrangement for rotors in accordance with prior practice.

FIG. 2 illustrates an arrangement in accordance with the prior art in which a fairing is not used.

At the end face 17 of the rotor, an insulating slot cell 36 and a channel 32, which may be conductive, extend somewhat from the face, although not to the extent of the coil end turns 24 which are only generally shown in this view. The arrows illustrate the flow path including the axial flow through the channel 32 and radial flow through radial slots 38 that extend through the coil slot turns 25, insulating spacer 40 and slot wedge 42. With this structure, the axial channel 32 at the bottom of the rotor slots 20 serves as a manifold from which gas is bled off through radial vents 38 cut in the rotor conductors. Each rotor slot 20 is completely lined below the wedge 42 with the insulating cell 36 and then the axial duct 32 is placed as a U-shaped channel in the slot bottom interior to the insulating cell. The continuous insulating cell provides a high integrity electrical insulation. In order to ensure the integrity of the insulation, it is the practice to have the insulation cell 36 and the channel 32 extend beyond the rotor body 16 into the end turn area of the machine as shown. The rotor cooling gas must therefore enter the axial duct 32 at a sharp edged protruding entrance, producing a high inlet pressure drop.

Figure 5:
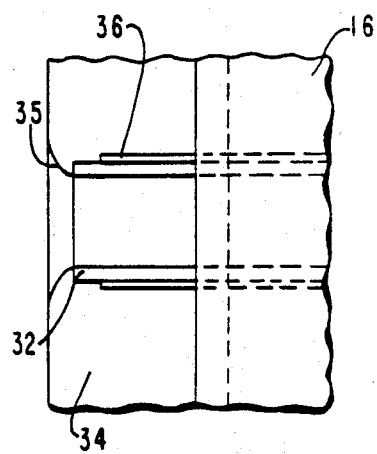
FIG. 5 is a plan view of certain elements of the structure of the embodiment of FIG. 3.
Figure 4:
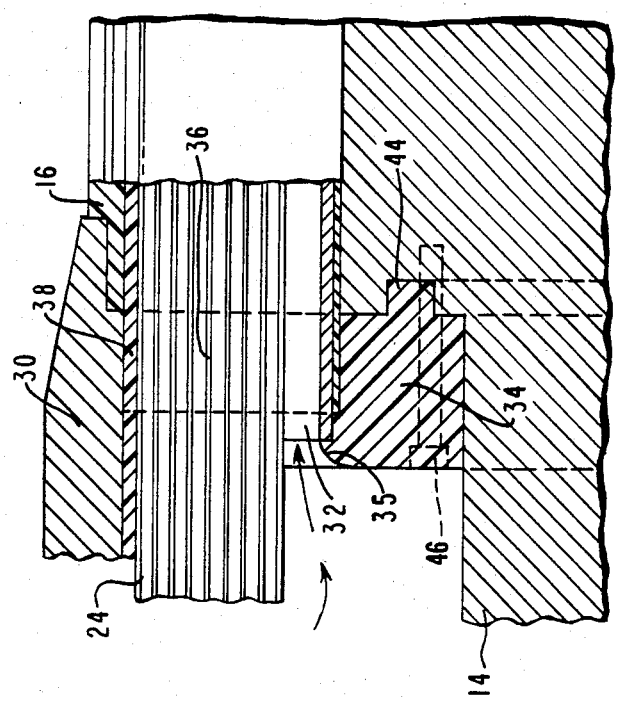
FIG. 4 is a cross-sectional view of the structure of FIG. 3.
Figure 3:
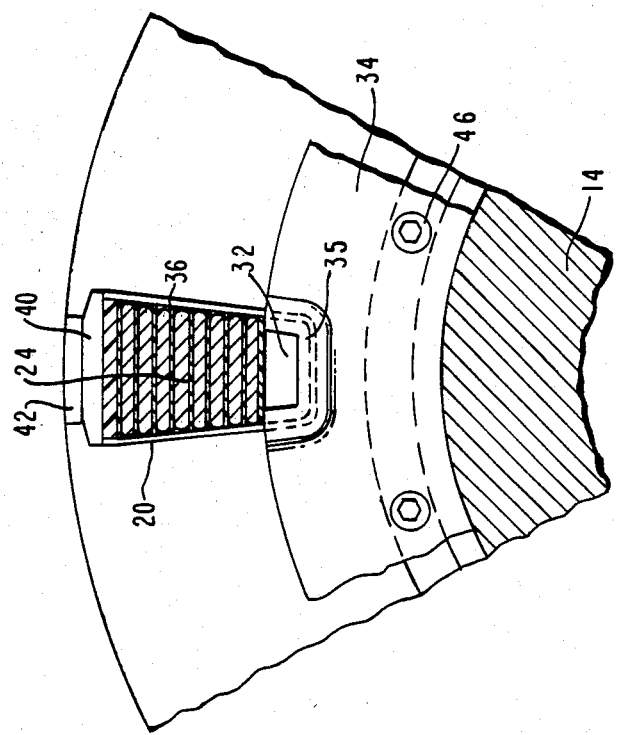
FIG. 3 is an end view of a portion of a dynamoelectric machine in accordance with an embodiment of the present invention.

In an embodiment in accordance with this invention as shown in FIG. 3, the elements of the structure of FIG. 2 are retained with however, in combination with those elements, the fairing 34 that is an element of solid material, such as a non-metallic composite, disposed between the shaft 14 and the end turns 24 with, as shown in FIGS. 4 and 5, portions 35 extending beyond the axial extent of the channel 32 and cell 36 forming a smooth transition region immediately below the entrance to the channel (FIG. 4) and laterally adjacent to the entrance to the channel (FIG. 5). The fairing 34 is conveniently provided as an annulus with a curved flow inlet portion 35 shaped to fit around the channel opening at each coil slot 20. The fairing 34 can be fixed to the rotor by being placed in a mounting groove 44 and secured by fasteners such as mounting bolts 46 extending through it into the rotor body 16.

It can be calculated that the inlet pressure drop is about 20 times greater in the structure of FIG. 2 than it is in the structure of FIGS. 3 through 5. As a consequence, the flow rate through the channels 32 and thus through the radial vents 38 is much improved in the structure in accordance with the invention.

Figure 8:
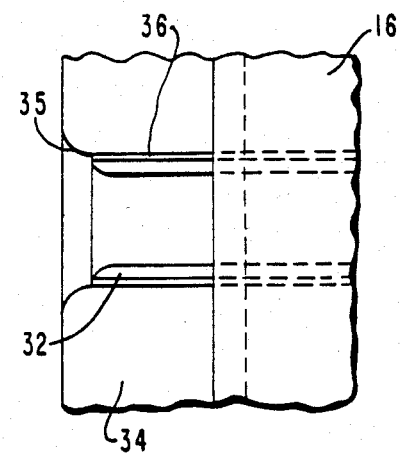
FIG. 8 is a plan view of still another embodiment.

In the embodiment of FIGS. 3–5, the fairing 34 fits closely about the protruding ends of both the cell 36 and the channel 32. The channel 32 extends farther out of the rotor body 16 than does the cell 36. The invention may also be applied with good results where the fairing 34 is designed to have its flow inlet portion 35 fitting closely about the cell but not necessarily the channel end, per se. For this purpose it is preferred that the cell and channel be of substantially equal extent. FIG. 8 is a modified version of FIG. 5 to show such an arrangement.

A further aspect of the structure that can be modified for improved air flow is to provide the channel 32 with inside edges that are rounded rather than square cut. FIG. 8 shows the rounded inside edges at 33.

The fairing could be provided, if desired, as a plurality of separate elements respectively around each coil slot although this is generally less preferable because of the additional steps required in assembly.

Additional forms the invention can take is believed apparent from those shown and described herein.

Figure 7:
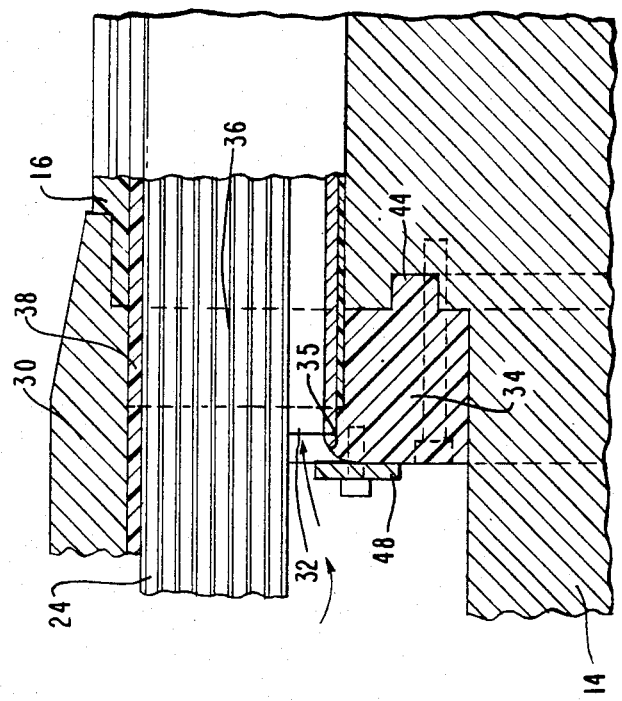
FIGS. 6 and 7 are respectively end and sectional views of a further embodiment of the invention.
Figure 6:
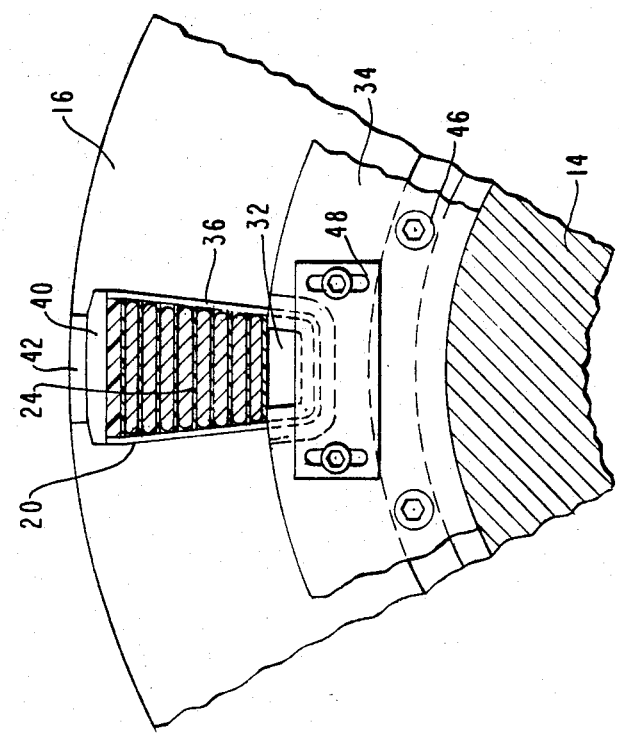

FIGS. 6 and 7 show the respective views of FIGS. 3 and 4 with the addition of a blocking element 48 fastened to fairing 34 (by fasteners, as shown, or adhesive) to partially block the entrance to channel 32. Element 48 is for "orificing", as previously described, to balance the slot conductor temperatures by limiting air to a slot that is otherwise cooler than other slots. FIGS. 6 and 7 show how the fairing 34 provides a convenient mounting surface for the blocking element 48.

We claim:

1. A dynamoelectric machine comprising:

a stator and a rotor centrally disposed on a shaft for rotation within said stator;

said rotor comprising an outer body portion having axially opposing end faces, said body portion having a plurality of axially extending coil slots in each of which is located an insulating slot cell adjacent the surface of said body portion, an axial ventilating channel at the bottom of each said slot, a plurality of coil turns, and a wedge closing the upper end of each said slot;

said coil turns extending axially out of said body portion beyond at least one of said end faces, said cell and said channel extending axially out of said body portion beyond said end face to an extent less than said coil turns;

a fairing of solid material disposed outward from said at least one of said end faces between said shaft and the extended portions of said coil turns, said fairing extending beyond the axial extent of said cell and said channel and less than the extent of said coil turns; and said fairing fitting closely around the extended portion of said cell and, at the inlet to said channel, having a curved portion providing a smooth flow transition region through which coolant gas flows into said channel without encountering the protruding sharp edges of said channel and said cell that would disturb the flow and cause a higher pressure drop.

2. A dynamoelectric machine in accordance with claim 1 wherein:

said coil turns and said wedge having a plurality of radial ventilating slots between said channel and the exterior of said rotor; and said coil turns, said cell, and said channel extend axially out of said body portion beyond both of said end faces, with one said fairing at each of said end faces.

3. A dynamoelectric machine in accordance with claim 1 wherein:

said fairing is a continuous annulus and is fastened to said rotor by fasteners extending axially therethrough.

4. A dynamoelectric machine in accordance with claim 1 wherein:

said fairing has a blocking element supported thereon that extends partially across one of said channels to reduce flow therein and to balance thermally said plurality of slots.

* * * * *